United States Patent
Ishikawa et al.

(10) Patent No.: US 6,619,848 B2
(45) Date of Patent: Sep. 16, 2003

(54) CERAMIC DYNAMIC PRESSURE BEARING, MOTOR WITH BEARING, HARD DISC APPARATUS AND POLYGON SCANNER

(75) Inventors: Hironobu Ishikawa, Nagoya (JP); Tetsuji Yogo, Nagoya (JP); Takayoshi Morishita, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 26 days.

(21) Appl. No.: 10/073,298

(22) Filed: Feb. 13, 2002

(65) Prior Publication Data

US 2002/0159659 A1 Oct. 31, 2002

(30) Foreign Application Priority Data

Feb. 13, 2001 (JP) .......................................... 2001-35913

(51) Int. Cl.⁷ .............................................. F16C 32/06
(52) U.S. Cl. .................................... 384/100; 384/907.1
(58) Field of Search ................................ 384/100, 107, 384/114, 121, 279, 907.1

(56) References Cited

U.S. PATENT DOCUMENTS

| | | | |
|---|---|---|---|
| 5,688,053 A | | 11/1997 | Itoh et al. |
| 5,776,408 A | * | 7/1998 | Ghosh et al. ................ 264/400 |
| 5,792,717 A | * | 8/1998 | Takayama ................ 384/907.1 |
| 5,839,880 A | * | 11/1998 | Okada et al. ................ 415/229 |
| 6,464,906 B1 | * | 10/2002 | Niwa et al. ..................... 264/7 |

FOREIGN PATENT DOCUMENTS

| | | |
|---|---|---|
| EP | 0 732 517 B1 | 12/2001 |
| JP | 5-187436 | 7/1993 |
| JP | 6-60404 | 8/1994 |
| JP | 8-93750 | 4/1996 |
| JP | 9-126229 | 5/1997 |
| JP | 2-822765 | 9/1998 |

\* cited by examiner

Primary Examiner—Thomas R. Hannon
(74) Attorney, Agent, or Firm—Sughrue Mion, PLLC

(57) ABSTRACT

A ceramic dynamic pressure bearing comprising a first member and a second member, wherein the first member and the second member define a dynamic pressure gap therebetween, the first member and the second member relatively rotate around an axis of rotation, the relative rotation generates a fluid dynamic pressure in the dynamic pressure gap, the first member has a first surface directing to the dynamic pressure gap and the second member has a second surface directing to the dynamic pressure gap, and at least one of the first and second surfaces comprises ceramic, the ceramic comprises: a ceramic matrix that is selected from alumina ceramic, zirconia ceramic and silicon nitride ceramic; and 15 vol % to 70 vol % of an electrically-conductive inorganic compound phase based on the total amount of the ceramic, the phase is dispersed in the ceramic matrix, the phase comprises at least one compound selected from tungsten carbide, silicon carbide, conductive oxide, metallic nitride, metallic carbide, metallic boride, and metallic carbon nitride, and the metallic nitride, the metallic carbide, the metallic boride, and the metallic carbon nitride each independently comprises at least one of Hf, Mo, Ti, Zr, Nb, and Ta.

15 Claims, 9 Drawing Sheets

CERAMIC DYNAMIC PRESSURE BEARING THRUST DIRECTION

READIAL DIRECTION

THRUST DYNAMIC PRESSURE GAP-FORMING SURFACE

BEARING PORTION (BODY OF ROTATION)

MAIN SHAFT

AXIS OF ROTATION

RADIAL DYNAMIC PRESSURE GAP-FORMING SURFACE

MAIN SHAFT

DINAMIC PRESSURE GROOVE

THRUST PLATE

DYNAMIC PRESSURE GROOVE

1/10

$$d = \frac{dmax + dmin}{2}$$

CERAMIC DYNAMIC PRESSURE BEARING, MOTOR WITH BEARING, HARD DISC APPARATUS AND POLYGON SCANNER

FIELD OF THE INVENTION

The present invention relates to a ceramic dynamic pressure bearing, a motor with bearing, a hard disc apparatus, and a polygon scanner.

BACKGROUND OF THE INVENTION

Conventionally, as a bearing of a motor axis to be a driving source of electric machinery, a ball bearing has been more used, and in a precision machinery such as periphery machinery of computers, high speed rotation of motors has rapidly progressed, and for realizing excellent bearing performance less to cause irregularity of low rotation, abnormal sound or vibration, otherwise for prolonging service life of the bearing, a dynamic pressure bearing with intervention of a fluid as an air has been served. When, for example, a main shaft and a bearing portion disposed as surrounding the main shaft rotate around the axis of rotation, the dynamic pressure bearing supports a rotating shaft owing to dynamic pressure of the fluid occurring in a space between the outer periphery of the main shaft and the inner periphery of the bearing portion. There is also a bearing which supports faces of the main shaft or the bearing portion by dynamic pressure thrust.

By the way, as to the dynamic pressure bearing, mutual members opposing via the dynamic pressure gap do not cause contact therebetween under high speed rotation at enough high level of generated dynamic pressure, but when starting to drive at small rotation number or stopping, since sufficient dynamic pressure is not generated, the members contact each other. Materials composing parts of the above mentioned dynamic pressure bearing have ordinarily employed metals as stainless steels or those coated with resins, but metal made materials are often involved with problems of abrasion or seizure by the materials contacting when starting to drive or stopping. For avoiding such occasions, an attempt has been made to coat a lubricant layer such as a resin at parts directing to dynamic pressure gaps, but an effect is not always satisfied. Then, for sufficiently securing durability against abrasion or seizure, the members opposing via the dynamic pressure gap such as the main shaft or the bearing portion have been composed with ceramic as alumina.

However, in the above mentioned conventional dynamic pressure bearing, although parts are composed of ceramic, not a little abrasion sometimes happens when starting or stopping. Further, in the bearing supporting the thrust face by dynamic pressure such as a structure where a disc thrust plate is opposed to a thrust face of a rotating body, when the rotating body and the thrust plate contact, linking (a phenomenon that two members come into close contact due to vacuum created in the clearance therebetween) or abrasion is sometimes created.

SUMMARY OF THE INVENTION

A theme of the invention is to offer a ceramic dynamic pressure bearing less to cause abrasion when starting or stopping the rotation, and enabling to realize smooth rotation in the dynamic pressure bearing.

For solving the above mentioned problems, the ceramic dynamic pressure bearing according to the invention is characterized in that a dynamic pressure gap is formed between a first rotation member and a second rotation member relatively rotating around a predetermined axis of rotation, such that fluid dynamic pressure is generated in the dynamic pressure gap accompanying the relative rotation of the first rotation member and the second rotation member, in at least either of the first rotation member and the second rotation member, parts including surfaces (called as "dynamic pressure gap-forming surface" hereafter) directing to the dynamic pressure gap comprises an at least ceramic, and in a ceramic matrix comprising any of alumina ceramic, zirconia ceramic and silicon nitride ceramic, said comprised at least ceramic is a compound ceramic having a structure dispersed with 15 to 70 vol % electrically-conductive inorganic compound phase having main components of one kind or two or more kinds of compounds selected from tungsten carbide, silicon carbide, conductive oxide, metallic nitride, metallic carbide, metallic boride, and metallic carbon nitride. In the metallic nitride, the metallic carbide, the metallic boride, and the metallic carbon nitride, a main component is at least any of Hf, Mo, Ti, Zr, Nb, and Ta.

Figure 1:
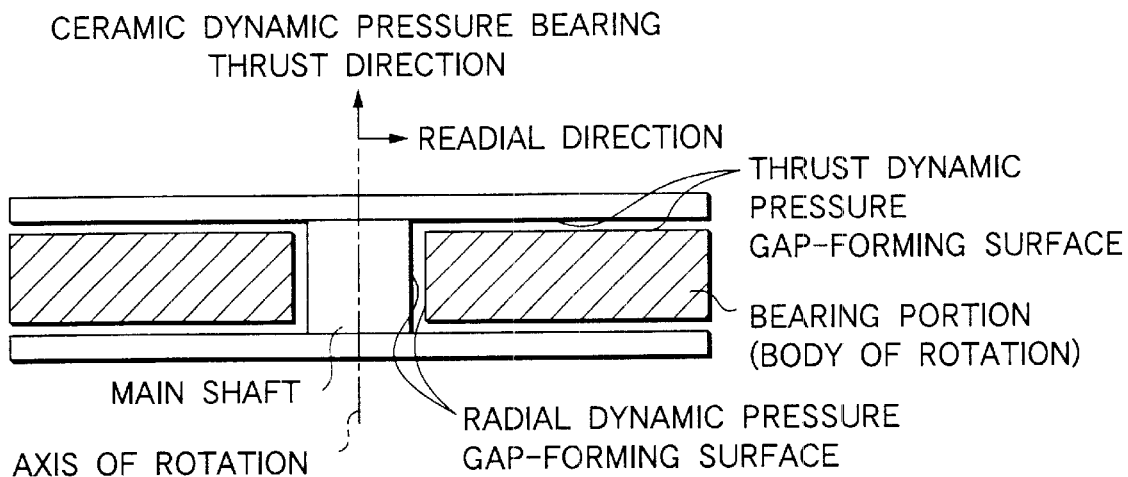
FIG. 1 is a schematically cross sectional view showing one example of composing a ceramic dynamic pressure bearing according to the invention.

In the drawings, 1 and 90 are polygon scanners; 3, 33, 101 and 251 are ceramic dynamic pressure bearings; 14, 39, 105 and 212 are main shafts; 15, 35, 107 and 221 a are bearing portions 17, 38, 91 and 240 are radial dynamic pressure gaps; 18 and 92 are thrust dynamic pressure gaps; 21, 23, 103, 109 and 222 are thrust plates; M is dynamic pressure gap-forming surface;

M1 and M2 are radial dynamic pressure gap-forming surfaces; and M3 to M6 are thrust dynamic pressure gap-forming surfaces.

DETAILED DESCRIPTION OF THE INVENTION

Inventors made earnest studies on factors easy to cause abrasion in dynamic pressure gap-forming surfaces made of ceramic when the bearing starts to drive or stops where the rotation speed becomes lower and the level of the generated dynamic pressure becomes smaller, and consequently found that electrostatic charge of the ceramic members is concerned therewith. That is, in the existing ceramic dynamic pressure bearing, an alumina ceramic of high insulation is employed, and while the members via the dynamic pressure gap repeat contacts at starting or stopping, static electricity produced by friction accumulates on the members. When a level of electrostatic charge becomes large, electrostatic suction force exerting between the members becomes large, and for example, when starting the rotation, until dynamic pressure overcoming the electrostatic suction force is generated, namely, until the rotation number becomes fairly high, the sucking and contacting conditions of the members are not released. On the other hand, when stopping, until the rotation number does not go down so much, the sucking and contacting condition of the members occurs by the electrostatic suction force. In short, it is assumed that, in either case, since the members contact each other under the condition where the relative rotation speed between the members is comparatively high, abrasion becomes large in the dynamic pressure gap-forming surface. In the bearing supporting the thrust face owing to the dynamic pressure, the electrostatic suction force results in furtherance of the linking when rotation member and the thrust plate contact.

Therefore, the invention makes an electrically-conductive inorganic compound phase in at least one part of ceramic composing the dynamic pressure gap-forming surface for giving moderate conductivity to ceramic, thereby enabling to effectively avoid electrostatic charge in the members, so that the electrostatic suction force between the members may be brought down to a low level, and abrasion is effectively checked from the dynamic pressure gap-forming surface or the linking is prevented from occurrence between the members. Incidentally, the electrically-conductive inorganic compound phase referred to in the invention include as a notion a semi-conductor inorganic compound phase.

Having good conductivity and comparatively high hardness with excellent durability, the conductive inorganic compound phase contained in the composing ceramic can be suitably employed as the composing ceramic for the dynamic pressure bearing of the invention. Specifically, the conductive inorganic compound phase has main components of one kind or two kinds or more selected from titanium nitride, titanium carbide, titanium boride, tungsten carbide, zirconium nitride, titanium carbon nitride, silicon carbide and niobium carbide, and it is especially favorable in conductivity and can be suitably used in the invention. Further, as conductive oxides, available are titanium oxide ($TiO_2$) tin oxide ($SnO_2$), copper oxide ($Cu_2O$), chromium oxide ($Cr_2O_3$), or nickel oxide (NiO). In particular, as the conductive inorganic compound phase having a main component of titanium oxide is good in conductivity, and may heighten strength of compound ceramic, it can be suitably used in the invention.

Further, the composing ceramic is a compound ceramic having a structure dispersed with the electrically-conductive inorganic compound phase in a ceramic matrix comprising any of alumina ceramic, zirconia ceramic and silicon nitride ceramic. Each of alumina ceramic, zirconia ceramic and silicon nitride ceramic is excellent in abrasion resistance, and if selecting them as the ceramic matrix, the abrasion resistance may be more heightened, and in turn, preferable conductivity and mechanical durability can be compatible at high level.

From the viewpoint of attempting anti-electricity of the composing ceramic in the dynamic pressure gap-forming surface, preferably, electric resistivity of the composing ceramic is $10^6$ Ω·cm or lower. Being more than $10^6$ Ω·cm, the electrostatic charge is easy to occur in the composing ceramic, and results in inconvenience such as abrasion or linking in the dynamic pressure gap-forming surface. By the way, the electric resistivity referred to in the description is meant by electric resistivity measured through a four probe method by contacting a probe to the dynamic pressure gap-forming surface formed with the composing ceramic.

The containing percent of the conductive inorganic compound phase in the compound ceramic is determined to be 15 to 70 vol %. Being less than 15 vol %, the conductivity of the composing ceramic is lacking (for example, the electric resistivity of $10^6$ Ω·cm or lower cannot be secured), and the above mentioned effect according to the invention might not be accomplished. In contrast, being more than 70 vol %, the properties of the ceramic composing the matrix are not enough exhibited, and in turn the strength or abrasion resistance by making the compound material cannot be expected so much. By the way, the containing percent of the conductive inorganic compound phase is more preferably 30 to 50 vol %. The compound ceramic material may be produced by mixing powders as a forming source of the conductive inorganic compound phase into powders as a forming basis to be a raw material of the ceramic matrix, forming and baking the raw material.

As to the ceramic matrix, in particular the alumina ceramic may be suitably used to the invention. The alumina is comparatively cheap, high in strength, and excellent in chemical stability. The alumina ceramic may be produced by baking a raw material made by mixing appropriate sintering assistant powders (for example, oxides such as Mg, Ca, Ce, Si, or Na) into alumina powders. In this case, if using alumina ceramic which contains 0.5 to 10 wt %, in terms of oxide, the sintering assistant components and a remainder composed of Al component in terms of $Al_2O_3$, this use is desirable in view of improving strength, toughness, and in turn, abrasion resistance in the dynamic pressure gap-forming surface formed with said ceramic.

On the other hand, as silicon nitride ceramic has high strength and excellent abrasion resistance other than the alumina ceramic, it may be suitably employed to the invention. The silicon nitride ceramic has a main body of silicon nitride, and a reminding component may be the sintering assistant component, and may contain 0.5 to 10 wt %, in terms of oxide, at least one kind selected from Mg and element groups of respective families of 3A, 4A, 5A, 3B (for example, Al (as alumina)) and 4B (as Si (silica)) of the Periodic Table. These mainly exist as oxide states in the sintered body (this case means by the containing percent in the silicon nitride ceramic to become a matrix). If the sintering assistant compound is less than 0.5 wt %, a fine sintered substance is difficult to be got. In contrast, being more than 10 wt %, shortage of strength, toughness or heat resistance is brought about, and in a case of sliding parts, it results in decrease of the abrasion resistance. The containing amount of the sintering assistant compound is desirably 1 to 8 wt %. In the invention, the expression of "main component" ("main substance" or "main" are synonymous) means, so far as not noting, the containing percentage of 50 wt % or higher of a focused material or materials.

As the sintering assistant compound of the 3A family, generally used are Sc, Y, La, Ce, Pr, Nd, Sm, Eu, Gd, Tb, Dy, Ho, Er, Tm, Yb, and Lu. As to the containing amounts of these elements R, only Ce is calculated in terms of RO2, and other are calculated in terms of R2O3. Oxides of respective heavy rare earth elements of Y, Ce, Tb, Dy, Ho, Er, Tm, and Yb are suitably used because of having an effect of improving strength, toughness and abrasion resistance of sintered silicon nitride. Other magnesia spinel or zirconia are available as the sintering assistant compound.

With respect to the structure of the sintered silicon nitride member, the main phase-crystal grain having a main component of silicon nitride has a formation combined with vitreous and/or crystalline combination phase. The main phase is desirably $Si_3N_4$ of β-percentage being 70 vol % or more (preferably, 90 vol % or more). In this case, the $Si_3N_4$ phase may be a substance where one part of Si or N is replaced with Al or oxygen, and further, metallic atom as Li, Ca, Mg or Y is made solid in the phase. For example, sialones may be exemplified in the following general formulae;

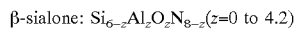

β-sialone: $Si_{6-z}Al_zO_zN_{8-z}$ (z=0 to 4.2)

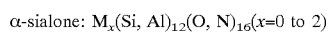

α-sialone: $M_x(Si, Al)_{12}(O, N)_{16}$ (x=0 to 2)

M: Li, Mg, Ca, Y, R (R is a rare earth element excluding La, Ce).

Further, the above mentioned sintering assistant compound mainly composes the combination phase, and sometimes one part thereof is probably taken into the main phase. The combination phase may contain unavoidable impurities, for example, silicon oxide contained in silicon nitride raw powders other than components intentionally added as the sintering assistant compound in the combination phase.

α-percentage (the percentage of α silicon nitride occupying in all silicon nitride) of the silicon nitride powder to be the raw material is desirably used 70% or more, and as the sintering assistant compound thereto, at least one kind selected from the element group of 3A, 4A, 5A, 3B and 4B is mixed 0.5 to 10 wt %, preferably 1 to 8 wt % in terms of oxide. When mixing the raw materials, as other than oxides of these elements, compounds changeable into oxides by baking may be mixed in forms of, for example, carbonate or hydroxide.

If using the zirconia ceramic as the matrix, the following effects occur. That is, by adopting a structure of so-called partially stabilizing zirconia as the zirconia ceramic, the ceramic matrix can be toughened on the basis of transformation-stress relaxation. $ZrO_2$ and $HfO_2$ as the main substances of the zirconia based ceramic phase are known to cause transformations among different three kinds of the phases of the crystalline structures in company with change in temperatures, the three kinds of the phases being a monoclinic system phase at lower temperature side including room temperature, a tetragonal system phase at temperature side higher than that, and a cubic crystalline system phase at still higher temperature side. If the whole of the zirconia based ceramic phase is composed with at least either of $ZrO_2$ and $HfO_2$, it is assumed that almost all of them are monoclinic system in the neighborhood of the room temperature. However, it is known that if bringing into solution oxide of alkaline earth metal or oxide rare earth metal (for example, calcia (CaO) or yttria ($Y_2O_3$)) of exceeding the fixed amounts as stabilizing components for $ZrO_2$ and $HfO_2$, the transformation temperature between the monoclinic system phase and the tetragonal system goes down, and the tetragonal system phase may be stabilized at a temperature range in the neighborhood of the room temperature.

It is known that the phase transformation from the tetragonal system phase to the monoclinic system phase is based on a martensite transforming mechanism or a similar phase transforming mechanism, and if stress is added from an outside, a transformation temperature rises, so that the tetragonal system phase brings about a stress inductive transformation and strain energy by this stress is consumed as a driving force of transformation, and consequently the added stress is moderated. Therefore, even if the stress is concentrated to the distal end of a crack generated in the material, the stress is moderated by transforming the tetragonal system phase into the monoclinic system phase, so that the crack is checked from propagation or moderated, and a value of fracture toughness goes up.

As the stabilizing components of the zirconia based ceramic phase, one kind or two kinds or more of Ca, Y, Ce and Mg are preferably contained within range of 1.4 to 4 mol % in total as the containing amount in the zirconia based ceramic phase at respective values of calculating in terms of oxides as Ca in terms of CaO, Y in terms of $Y_2O_3$, Ce in terms of $CeO_2$ and Mg in terms of MgO. Being less than 1.4 mol %, the containing ratio of the monoclinic system phase increases to consequently and relatively decrease the containing ratio of the tetragonal system phase, so that a stress relaxing effect is insufficiently available and the shortage of abrasion resistance is probably brought about. In contrast, being more than 4 mol %, the containing ratio of the cubic crystalline system phase increases, and the shortage of the abrasion resistance might be similarly brought about. The containing amount of the stabilizing component is more preferably 1.5 to 4 mol %, still more preferably 2 to 4 mol %.

As the stabilizing component of the tetragonal system phase, specifically, $Y_2O_3$ is high in strength of an obtained ceramic in comparison with cases of using other stabilizing components, and being comparatively cheap, it is suitably used in the invention. On the other hand, CaO and MgO are comparatively high in strength of obtained ceramics, though not being as using $Y_2O_3$, and being cheaper than $Y_2O_3$, it is suitably used in the invention. $Y_2O_3$, CaO and MgO may be used solely or in combination of two kinds or more.

$ZrO_2$ and $HfO_2$ being the main component (not limited to this, and "main component" referred to in the description is meant by components containing most amounts) of the zirconia based ceramic phase are similar in chemical and physical properties, and therefore a single use or both use in combination are available. But as $ZrO_2$ is cheaper than $HfO_2$, the zirconia based ceramic phase is more preferably composed with $ZrO_2$ as the main component. Generally supplied raw materials of $ZrO_2$ having ordinary purity often contain $HfO_2$ in fine amount, and when using such raw materials, for the above mentioned reason, it is scarcely necessary to positively remove $HfO_2$.

The zirconia based ceramic phase is desirably less than 1 in the ratio CW/TW of the existing weight CW of the cubic crystalline system phase and the existing weight TW of the tetragonal system phase. The cubic crystalline system phase is easy to grow when the containing amount of the stabilizing component increases and the transformation point goes down in relation with the tetragonal system phase or when the baking temperature is beyond 1600° C., and in comparison with the monoclinic system phase and tetragonal system phase, the cubic crystalline system phase has a nature ready for coarsening crystal grains during baking. The crystal grain of the coarsened cubic crystalline system phase has small interfacial combining force with other crystal grains, and if the amount of the cubic crystalline system phase increases until said ratio exceeds 1, the forming amount of the coarsened crystal grain also increases. Either case results in spoiling of the tipping resistance when forming sharp edge portions under the above mentioned conditions. So, the ratio of CW/TW being less than 1 is good, desirably less than 0.5, more desirably less than 0.1.

The information as to the existing ratio of the tetragonal systemphase and cubic crystalline systemphase is obtained as follows. For example, the ceramic member is mirror-ground at one part, and an X-diffraction is carried out at the groundpart by a diffractometer method. Then, in the diffract pattern to be obtained, since (111) intensity peak positions as main diffraction peaks of the tetragonal system phase and the cubic crystalline system phase appear as approaching each other, at first the existing amount of the monoclinic system phase is demanded from the ratio of the total intensity Im of (111) and (11-1) of the monoclinic system phase and the sum It+Ic of the (111) intensity of the tetragonal system phase and the cubic crystalline system phase. Next, this sintered substance is mechanically pulverized, and the X-diffraction is again carried out for demanding (111) intensity I'm and I'c of the monoclinic system phase and the cubic crystalline system phase. In this case, it is assumed that the tetragonal system phase of the sintered substance is transformed into the monoclinic system phase owing to the mechanical stress accompanied with said pulverization, the existing amount of the cubic crystalline system phase can be demanded from I'c/(I'm+I'c). Values of the thus obtained I'c/(I'm+I'c) being 0.5 or lower, desirably 0.1 or lower are welcome in view of heightening the abrasion resistance of members.

When using the matrix of the alumina ceramic, a compound ceramic material mixed with the zirconia ceramic may be employed for providing toughness in the matrix. The compound ceramic material can be produced by using, forming and baking such ceramic powders where the ceramic component of a highest containing percentage is one side of alumina and zirconia, and the ceramic component of a second higher containing percentage is the other side of alumina and zirconia. It is good that the mixing amount of zirconia ceramic vs. alumina ceramic is 5 to 60 vol %.

The ceramic composing the dynamic pressure gap-forming surface should be adjusted such that average grain diameters of the ceramic crystal grain fall within a range of 1 to 7 $\mu$m, thereby enabling to make a level of generating fluid dynamic pressure high and stable, and to realize more advantageous dimensions and forming amounts of air-holes in the surface in view of effectively restraining inconveniences such as abrasion by adhesion, seizure or linking when starting or stopping the dynamic pressure bearing. The average grain diameters of the ceramic crystal grains are controlled to be within a comparatively small value of 1 to 7 $\mu$m, whereby the mechanical strength of the composing ceramic can be heightened and in turn the abrasion resistance can be increased.

If the average grain diameters of the ceramic crystal grain are less than 1 $\mu$m, the average dimensions of the surface air-holes to be formed are too small, and the abrasion by adhesion, seizure or linking are easy to occur in the dynamic pressure gap-forming surface when starting or stopping the rotation of the bearing. In addition, the level of the fluid dynamic pressure occurring in the dynamic pressure gap is easily short, and causes vibration in rotation. On the other hand, if exceeding 7 $\mu$m, the average dimensions of the surface air-holes to be formed are too large reversely, and excessive turbulence is generated in the dynamic pressure gap, and vibration is easily made in the rotating shaft. The average sizes of the ceramic crystal grain are more desirably 2 to 5 $\mu$m.

For realizing the above mentioned more advantageous dimensions and the forming amounts of the surface air-holes, it is more desirable that an area rate of the ceramic crystal grain having the grain diameter of 2 to 5 $\mu$m is 50 to 80%. Being less than 50%, for example, in case larger grains than the upper limit are much, the grain is difficult to drop in itself, probably resulting in shortage of the area rate of the surface air-holes which usefully contribute to generation of dynamic pressure. On the other hand, in case smaller grains than the lower limit are much, the average dimension of the surface air-holes to be formed is apt to become small. Either case might be disadvantageous for producing the dynamic pressure of a sufficient level.

Figure 11:
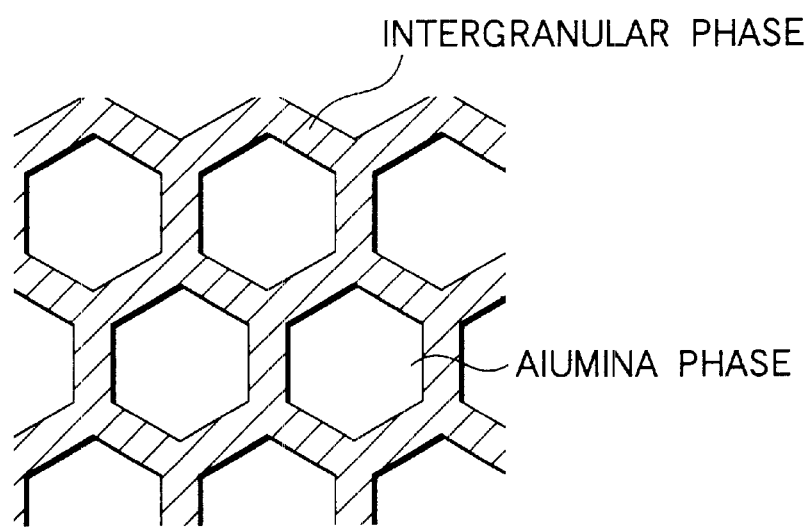
FIG. 11 is a schematic view showing a structure of sintered alumina ceramic.

For example, with respect to the composing ceramic, as shown in FIG. 11, in case the ceramic crystal grain composed of the ceramic matrix phase or the conductive ceramic phase has a structure combined with intergranular phases resulting from the sintering assist agent, it is assumed that when grinding, crystal grains drop mainly by destruction of the intergranular phase. Vacant spaces after dropping of crystal grains remain as the air-holes opened in the dynamic pressure gap-forming surface. It is considered that crystal grains are easy to drop in these parts where intergranular combination force relatively lowers, such as parts where, in particular, an intergranular phase is locally thin, or the intergranular phase is lacking owing to existence of internal cavities, or parts where the intensity of the intergranular phase is short by existence of cracks caused owing to segregation in components or thermal stress. In the invention, the expression of "main component" ("main substance" or "main" are synonymous) means, so far as not noting, the containing percentage of 50 wt % or higher of a careful material or materials.

Figure 12A:
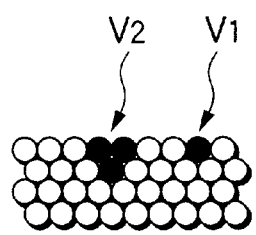
FIGS. 12 (12(a) and 12(b)) is schematic views showing various air-holes formed by ceramic crystal grains falling.
Figure 12B:
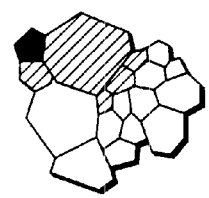

For example, if one of the crystal grains drops, as seeing the air-hole V1 of FIG. 12(a) (the white is grains not dropping and the black is grains dropping), the air-hole corresponding to the shape and dimension is formed. On the other hand, if plural crystal grains drop in a lump, the air-holes as V2 come out. As shown in FIG. 12(b), ordinarily, crystal grains in various dimensions exist, and if a large crystal grain is encircled with plural small grains and these small grains fall in succession, the center large crystal grain often fall. In this case, dimensions of air-holes to be formed are naturally larger than those of respective crystal grains.

In particular, anisotropy in shapes of respective crystal grains is small and equi-axed, and in case parts of intergranular combining force decreasing as mentioned above are formed with certain spread, when polishing force from a grinding stone or an abrasive grain acts over a plurality of crystal grains, the dropping form as V2 is easier to frequently happen. In this case, an average dimension of the surface air-hole to be formed is larger than the average dimension of the crystal grain set to be 1 to 7 $\mu$m. The surface air-holes are formed as scattered isotropically in the dynamic pressure gap-forming surface not depending on the grinding direction. By making the average dimension of the surface air-hole larger than the average dimension of the crystal grain, it is possible to more increase the level of the generated dynamic pressure and realize the more stable rotation of the bearing.

Figure 6:
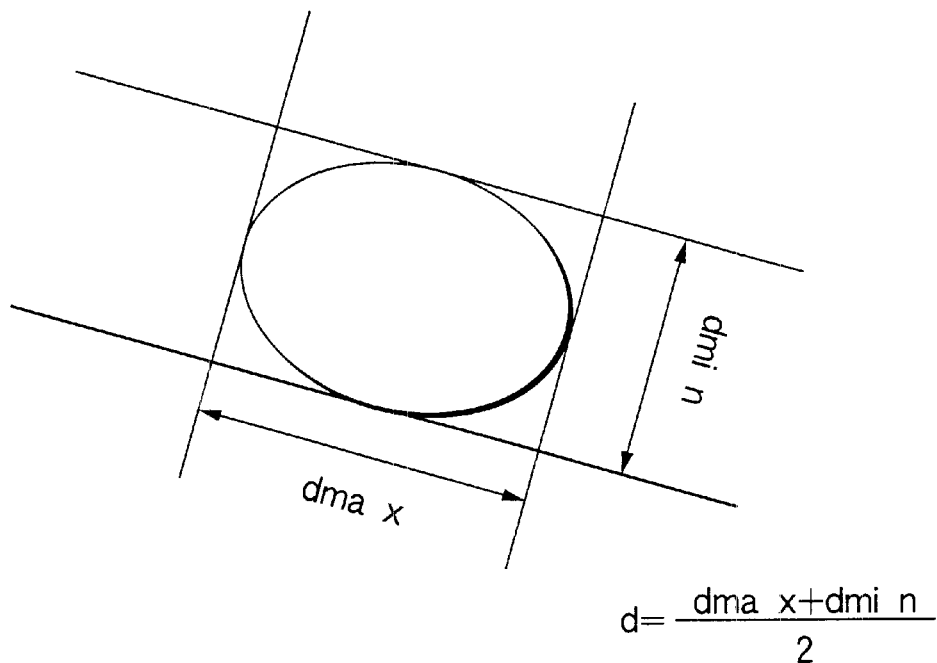
FIG. 6 is an explanatory view showing a definition of dimension of the air hole (or crystal grain)

Incidentally, the dimensions of the surface air-hole (or the crystal grain) referred to in the description are expressed with average values of a minimum space dmin and a maximum space dmax of the parallel lines (that is, d=(dmin+dmax/2) as shown in FIG. 6, when, on an observing face of the structure of the dynamic pressure gap-forming surface by SEM or an optical microscope, with respect to an external outline of the surface air-hole (or the crystal grain), the external circumscribed parallel lines not traversing the inside thereof are variously drawn as changing the positional relation.

It is convenient that the average dimensions of the surface air-holes existing in the dynamic pressure gap-forming surface made of the above mentioned composing ceramic are specifically 2 to 20 $\mu$m. If positively forming the surface air-holes of the average dimension being 2 to 20 $\mu$m, a level of generating fluid dynamic pressure can be heightened and stabilized. Further, in a case of the dynamic pressure bearing to be formed with a space for causing a later mentioned thrust dynamic pressure, a linking can be avoided from appearance.

When the average dimension of the surface air-hole exceeds 20 $\mu$m, an excessive turbulence occurs in the dynamic pressure gap, vibration is easily created in the rotation shaft. In contrast, being less than 2 $\mu$m, the abrasion by adhesion, seizure or linking are easy to occur in the dynamic pressure gap-forming surface when starting or stopping the rotation of the gearing. In addition, the level of fluid dynamic pressure occurring in the dynamic pressure gap is easily short, and causes vibration in rotation. The average dimension of the surface air-hole is more desirably 5 to 15 $\mu$m.

As to the dimension of the respective surface air holes, those of 2 $\mu$m or smaller do not so much contribute to the generation of dynamic pressure, and if those of exceeding 20 $\mu$m too much exist, vibration is ready for issuing. That is, the dimension of 2 to 20 $\mu$m is suited for usefully contributing to the generation of dynamic pressure and realizing the stable rotation. The forming area rate of the surface air-hole falling in the dimensional range in the dynamic pressure gap-forming surface is more difficult to generate seizure or linking in the dynamic pressure gap-forming surface when starting or stopping rotation, and in view of heightening the level of the fluid dynamic pressure occurring in the dynamic pressure gap, 15% or higher is good, and 20% or higher is more desirable. In view of effectively restraining occurrence of vibration, the area rate is 60% or lower, more desirably 40% or lower.

For usefully contributing to the generation of dynamic pressure and realizing the stable rotation, the more suited dimension of the surface air-hole is 5 to 15 $\mu$m, and it is convenient that the forming area rate in the dynamic pressure gap-forming surface falling in the dimensional range is 15 to 30%.

The area rate of the surface air-hole referred to in the description is meant by a value where the total area of the air holes observed on the dynamic pressure gap-forming surface is divided with the area of the dynamic pressure gap-forming surface. In case the dynamic pressure gap-forming surface is formed with the known grooves of dynamic pressure, the area rate of the surface air-hole is calculated with respect to an area of the dynamic pressure gap-forming surface excepting the groove of dynamic pressure. The measurement of the area rate is carried out by observing the area of the dynamic pressure gap-forming surface by means of a magnification observing instrument such as the optical microscope, determining a measuring area of a square of 300 $\mu$m×300 $\mu$m in an observing visual field, and making a calculation by dividing the total area of the surface air-holes distinguished in said measuring area with the area of the measuring range. For improving the measuring precision, it is desirable to determine the measuring ranges to be five places or more in one range of the dynamic pressure gap-forming surface and calculate the area rate of the surface air-holes as the average values of the measuring ranges.

Desirably, the surface air-holes in the dynamic pressure gap-forming surface do not exist as much as possible in those of exceeding 20 $\mu$m as the dimension easy to bring about causes of vibration. Specifically, it is desirable that the forming area rate of the surface air-holes exceeding 20 $\mu$m in the dynamic pressure gap-forming surface is 10% or less, desirably 5% or less. In view of avoiding occurrence of vibration, it is desirable that the maximum dimension of the surface air-holes existing in the dynamic pressure gap-forming surface is 100 $\mu$m or smaller, namely, no surface air-holes larger than 100 $\mu$m exist.

The wholes of the first member and the second member forming the dynamic pressure gap may be respectively composed with the above mentioned composing ceramic (called briefly as "ceramic" hereafter). If the ceramic composing the members has a fine sintered structure with less air-holes in the inside, and the part of the dynamic pressure gap-forming surface has a structure with comparatively much air-holes, such structures are desirable for making compatible heightening the level of generating dynamic pressure, avoiding abrasion by adhesion, seizure and linking, and improving strength and abrasion resistance. Specifically, it is convenient that mainly the air-holes of 2 to 20 $\mu$m existing in the sintered ceramic are locally present in the form of the surface air-holes in the dynamic pressure gap-forming surface. For efficiently forming such structures, as mentioned above, it is effective to form the surface air-holes by dropping the ceramic crystal grains when finishing the process on the dynamic pressure gap-forming surface.

The dynamic pressure gap-forming surface may be a radial dynamic pressure gap-forming surface formed in a radial direction with respect to the axis of rotation of the bearing. That is, the first member is formed in axis shape, and is inserted in an insertion hole defined in the second member, while an inside of the insertion hole of the second member and an outer periphery of the first member inserted in said inside are respectively made radial dynamic pressure gap-forming surfaces, and radial dynamic pressure gaps are defined between the radial dynamic pressure gap-forming surfaces.

For example, in a case of the dynamic pressure bearing having the structure exemplified in FIG. 1, the radial direction is a perpendicular direction (accordingly, a diameter direction) with respect to the axis direction of rotation (vertical directions in the figure) of the main shaft as the first member. For example, in FIG. 1, an outer peripheral face of the main shaft being the fixed first member and an inter peripheral face of the bearing portion being the second member composed as a tubular rotating body, are the radial dynamic pressure gap-forming surfaces. By applying the inventions it is possible to effectively prevent or restrain abrasion by adhesion or seizure owing to electrostatic charge when starting and stopping the bearing between the first and second members with respect to the radial dynamic pressure gap.

On the other hand, the dynamic pressure gap-forming surface may be a thrust dynamic pressure gap-forming surface formed in a thrust direction with respect to the axis of rotation of the rotating body. That is, the first member is disposed as opposite to an end of at least one side of the second member in the direction of the axis of rotation, and said end of the second member and the opposite face of the first member are respectively made thrust dynamic pressure gap-forming surfaces, and thrust dynamic pressure gaps are defined between the thrust dynamic pressure gap-forming surfaces.

For example, in a case of the dynamic pressure bearing having the structure exemplified in FIG. 1, the thrust direction is the axis direction of the main shaft, that is, the direction of the axis of rotation (the vertical direction in the figure). For instance, in FIG. 1, the end face of the bearing portion being the second member composed as the cylindrical rotating body and the face of a thrust plate being the first member opposite to the end face of the bearing portion in the axial direction, are a thrust dynamic pressure gap-forming surface. The thrust dynamic pressure gap-forming surface may be a little oblique from the vertical face with respect to the axis direction of rotation. By applying the invention, it is possible to effectively prevent or restrain abrasion by adhesion, seizure and linking owing to electrostatic charge when starting and stopping the bearing between the first and second members with respect to the thrust dynamic pressure gaps. In particular, if a strong linking is generated in a case of a large combination in contacting area such as between the thrust plate and the end face of the bearing plate, the starting itself of the bearing might be impossible, but by applying the invention, such inconvenience can be very effectively avoided.

By the way, it is of course possible to form both of the radial dynamic pressure gap and the thrust dynamic pressure gap in one bearing as seen in FIG. 1. In this case, depending on forming of the respective dynamic pressure gaps, the first member (or the second member) viewed from the radial dynamic pressure gap and the first member (or the second member) viewed from the thrust dynamic pressure gap may be the same members or different members in the substance. For example, in the example of FIG. 1, the second member is the bearing portion in each view, the inner peripheral face thereof is the radial dynamic pressure gap-forming surface, and both ends are the thrust dynamic pressure gap-forming surfaces. On the other hand, as to the first member, viewing from the radial dynamic pressure gap, the main shaft is the first member, while viewing from the thrust dynamic pressure gap, a pair of thrust plates opposite to both ends of the bearing portion are the first members. The main shaft is non rotary but a fixed shaft. As seeing in FIG. 10, such a bearing 251 is also available where the main shaft 212 is at the rotating side and a cylindrical bearing portion 221 is at the fixed side.

Further, the dynamic pressure bearing of the invention may be structured such that the length in the axial direction of the dynamic pressure bearing is larger than the outer diameter of the thrust dynamic pressure gap-forming surface, otherwise the thrust dynamic pressure gap is not formed and the obliquity at rotation of the rotating body is regulated by dynamic pressure produced at the radial dynamic pressure gap. This regulates, as shown in, e.g., FIG. 7, the dynamic pressure bearing having the long rotating shaft, and when the bearing portion 35 as the rotating body is oblique, this obliquity is regulated and revised by pressure produced at the radial dynamic pressure gap 37. On the other hand, the dynamic pressure bearing may be also structured such that the length in the axial direction of the dynamic pressure bearing is smaller than the outer diameter of the thrust dynamic pressure gap-forming surface and the obliquity at rotation of the rotating body is mainly regulated by dynamic pressure produced at the thrust dynamic pressure gap. This regulates, as shown in, e.g., FIG. 3, the dynamic pressure bearing having the short rotating shaft, and when the bearing portion as the rotating body is inclined, this inclination is regulated and revised by dynamic pressure produced at the thrust dynamic pressure gap.

Dynamic pressure grooves maybe formed in the dynamic pressure gap-forming surface. For example, the rotating shaft as the radial dynamic pressure gap-forming surface is formed on the outer periphery with the known dynamic pressure grooves, thereby enabling to realize smoother rotation. As exemplified in FIG. 2($a$), for example, the shaft to be inserted in the bearing portion may be formed on the outer peripheral surface (the radial dynamic pressure gap-forming surface) with a plurality of the dynamic pressure grooves at determined distance in the peripheral direction. This practiced embodiment shows rows of linear groove oblique at a determined angle with a bus bar of the outer periphery of the shaft, but groove patterns of angular type (or boomerang type) are formed overall periphery at fixed distance such that front ends of the groove patterns are positioned on reference lines in the axially peripheral direction, and other known embodiment, so-called herringbone may be employed. Further, as exemplified in FIG. 2($b$), the dynamic pressure grooves may be formed on the surface of, e.g., the thrust plate (the thrust dynamic pressure gap-forming surface). This example forms, in the peripheral direction, a plurality of curved groove portions gradually reducing distance from the center of the thrust plate.

The dynamic pressure bearing according to the invention may be usefully served as the bearing to, for example, the main shaft portion of rotating a hard disc of the hard disc apparatus, to the main shaft portions of rotating discs of peripheral machinery of computers such as CD-ROM drive, MO drive, or DVD drive, besides to the main shaft portion of rotating polygon mirror of polygon scanner used in laser printers or copiers. For the bearings of the rotation driving part in the precision machinery, high speed rotation such as 8000 rpm or higher (if a still higher speed is demanded, higher than 10000 rpm or higher than 30000 rpm), and by application of the invention, the level of generating fluid dynamic pressure can be highly stabilized, and in turn, the effect of decreasing vibration can be usefully drawn out. In addition, the invention is to offer a motor with a bearing in which the ceramic dynamic pressure gap is used as the bearing of a motor rotation outputting portion. Also the invention is to offer a hard disc apparatus which is provided with the motor having the bearing and a hard disc rotated and driven by the motor with the bearing, and offer a polygon scanner which is provided with the motor having the bearing and a polygon mirror rotated and driven by the motor having the bearing.

In the following description, practiced embodiments of the invention will be explained through the illustrated examples.

Figure 3:
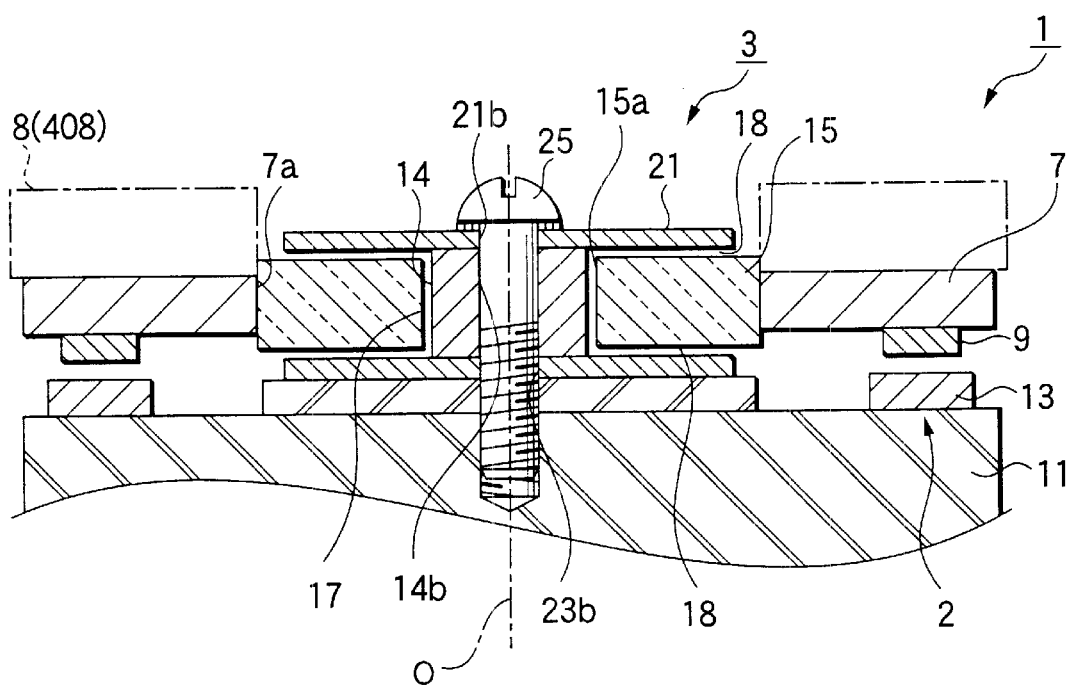
FIG. 3 is a front and cross sectional view showing one example of a motor unit for a polygon scanner employing the inventive ceramic dynamic pressure bearing.

The ceramic dynamic pressure bearing 3 shown in FIG. 3 (also called briefly as "dynamic pressure bearing" hereafter) is used to, for example, the motor with the dynamic pressure bearing for rotating and drive the polygon mirror 8 in the polygon scanner 1, using the air as the fluid for generating the dynamic pressure. In the motor 2 with the dynamic pressure bearing, for rotating a cylindrical bearing portion 15 (the rotating body), a permanent magnet 9 is furnished on a supporter 7 unitary with the outer periphery of the bearing portion 15 while a coil 13 is furnished on a base 11 in opposition to the permanent magnet 9. The permanent magnet 9 and the coil 13 may be replaced each other.

Figure 4A:
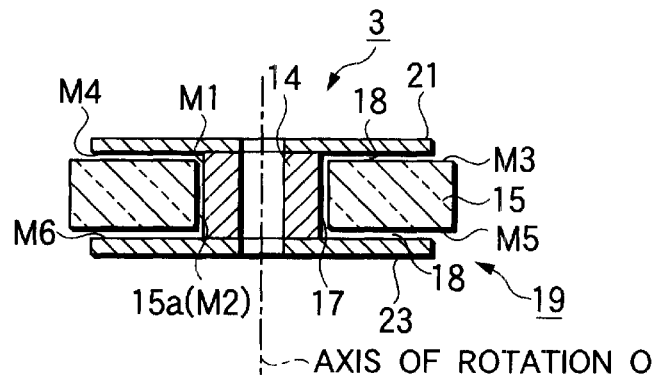
FIGS. 4 (4(a) and 4(b)) is a front and cross sectional view and a disassembled perspective view of the ceramic dynamic pressure bearing as elementary parts of FIG. 3.
Figure 4B:
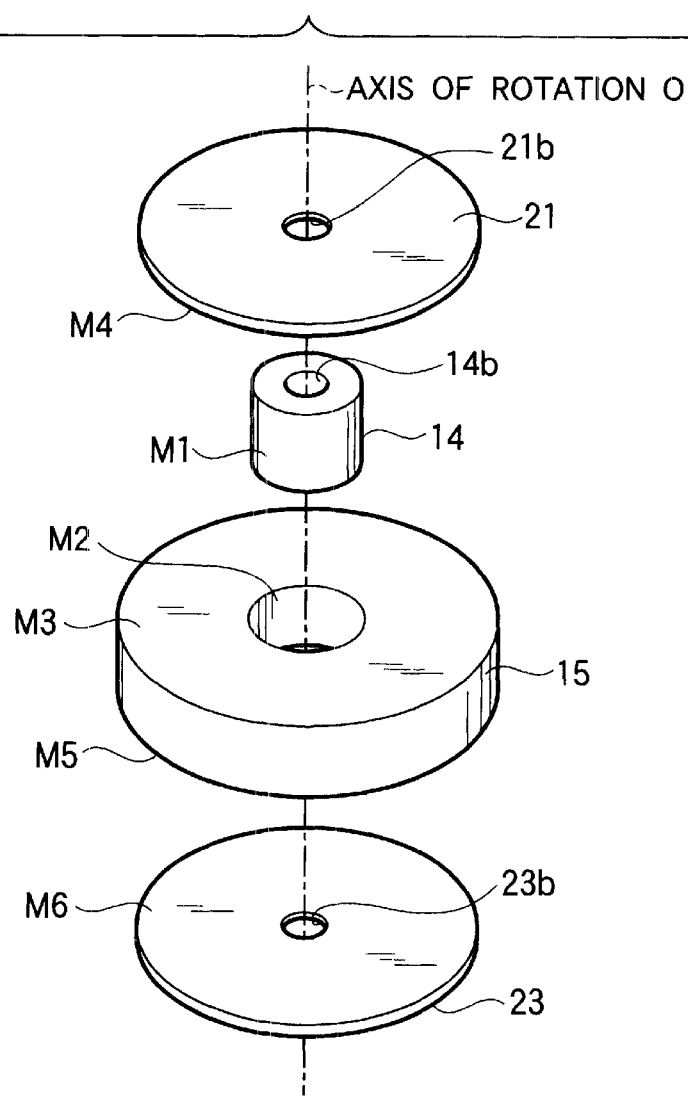

As to the ceramic dynamic pressure bearing 3, an insertion hole 15a of the cylindrical bearing portion 15 (e.g., inner diameter: 15 mm, outer diameter: 25 mm, axial length: 8 mm) is inserted with a cylindrical main shaft 14 (e.g., inner diameter: 5 mm, outer diameter: 15 mm, axial length: 8 mm). As illustrated in FIG. 4, the inner peripheral face M2 of the insertion hole 15a and the outer peripheral face M1 of the main shaft 14 are made the radial dynamic pressure gap-forming surface, and for producing therebetween the dynamic pressure in the radial direction with respect to the axis O of rotation, the radial dynamic pressure gap 17 filled with the air is formed. The size of the radial dynamic pressure gap 17 is, e.g., around 5 $\mu$m. Viewing from forming of the radial dynamic pressure gap 17, the main shaft 14 is the first member and the bearing portion 15 is the second member.

On the other hand, the main shaft 14 is coaxially unitary at both ends with disc-like thrust plates 21, 23 (e.g., inner diameter: 5 mm, outer diameter: 25 mm, thickness: 2 mm), and inside plates M4, M6 of the thrust plates 21, 23 are opposite to both ends M3, MS of the bearing portion 15 being the rotating body. In this embodiment, the thrust plates 21, 23 are, as seen in FIG. 3, put on the edge face of the main shaft 14 at the inner edge parts of the inside holes 21b, 23b, and a bolt 25 inserted in the center hole 14b of the main shaft 14 is urged into the base 11 and secured, but the securing is not limited to this embodiment.

As illustrated in FIG. 4, the plate faces M4, M6 of the thrust plates 21, 23 and both end faces M3, M5 of the bearing portion 15 are respectively the thrust dynamic pressure gaps, and for producing therebetween the dynamic pressure in the thrust direction with respect to the axis O of rotation, the thrust dynamic pressure gaps 18, 18 filled with the air is formed. The respective sizes of the thrust dynamic pressure gaps 18, 18 are, e.g., around 6 $\mu$m. Viewing from forming of the thrust dynamic pressure gaps 18, the thrust plates 21, 23 are the first members and the bearing portion 15 is the second member.

In this example, the main shaft 14, the bearing portion 15 and the thrust plates 21, 23 are composed overall of matrixes made of, e.g., alumina ceramic, and compound ceramic contained thereto with the conductive inorganic compound phase of 15 to 75 vol % (desirably 30 to 50 vol %) The electric resistivity measured at the respective dynamic pressure gap-forming surfaces has comparatively high conductivity as $10^6$ $\Omega$·cm or lower. As a result, the electrostatic charge of the respective members is effectively avoided or restrained. The average grain diameters of the ceramic crystal grains in the dynamic pressure gap-forming surfaces M1 to M6 are 1 to 7 $\mu$m, desirably 2 to 5 $\mu$m. The area rate of the ceramic crystal grains of diameters being 2 to 5 $\mu$m is 50 to 80%. In addition, the dynamic pressure gap-forming surfaces M1 to M6 are formed with many surface air holes as seen in FIG. 5.

As having already explained, according to the invention, as a result of preventing electrostatic charge of the members, abrasion by adhesion, or linking resulted from electrostatic suction are difficult to occur on the dynamic pressure gap-forming surface when starting or stopping the rotation. In particular, in the thrust dynamic pressure generating space 18, a big effect is exhibited for avoiding the linking occurrence between the thrust plates 21, 23 and the bearing portion 15.

The average sizes of the surface air-holes positively formed on the dynamic pressure gap-forming surface when grinding (later mentioned) are 2 to 20 $\mu$m. If the area rate in the dynamic pressure gap-forming surface is 10 to 60%, desirably 20 to 50%, the abrasion by adhesion or the linking are more difficult to occur, and it is possible to heighten the level of the fluid dynamic pressure generated in the dynamic pressure gap.

In view of prevention of occurrence of vibration, preferably the maximum size of surface pores present on the dynamic pressure gap-forming surface is not greater than 100 $\mu$m; i.e. surface pores having a size in excess of 100 $\mu$m should not be present.

Preferably, the dynamic pressure gap-forming surface is coated with a hard carbon film formed mainly of amorphous carbon and having a thickness smaller than the average size of surface pores. The film prevents potential occurrence of wear and adhesion even when the dynamic pressure gap-forming surfaces come into contact with each other in a state of low-speed rotation, which arises at the time of starting or stopping and tends to involve occurrence of insufficient dynamic pressure. The "hard carbon film formed mainly of amorphous carbon" refers to a film whose skeleton texture serving as its main body is amorphous and whose Vickers hardness is not less than 1500 kg/mm$^2$. The hardness of the film can be measured by use of, for example, a dynamic, ultra-low hardness tester (e.g., NHT, product of CSEM Instruments in Switzerland). The average thickness of the film is rendered smaller than the average size of surface pores in order to prevent excessive blockage of surface pores, which are actively formed for enhancement of a dynamic-pressure generation effect.

The hard carbon film can be formed by the method described in Japanese Patent Publication (kokoku) No. H06-60404. In this case, preferably, in order to effectively deposit a hard carbon film in such a manner as not to block surface pores, which contribute to generation of dynamic pressure, the vapor of a material to be deposited flows in such a manner as to impinge obliquely on the surface of a member for film deposition.

For accomplishing the above effect, it is sufficient to adjust the size of the surface air-hole K and the area rate to be in the above mentioned ranges as to at least one of the dynamic pressure gap-forming surfaces M1 to M6 (for example, only either of the radial dynamic pressure gap-forming surfaces M1, M2, only one of the thrust dynamic pressure gap-forming surfaces M3, M4, or only one of M5, M6), and for more heightening the effect, in the dynamic pressure gap-forming surfaces as many as possible, ideally, in all the dynamic pressure gap-forming surfaces M1 to M6, it is desirable to adjust the size of the surface air-hole K and the area rate in the above mentioned ranges.

Figure 2A:
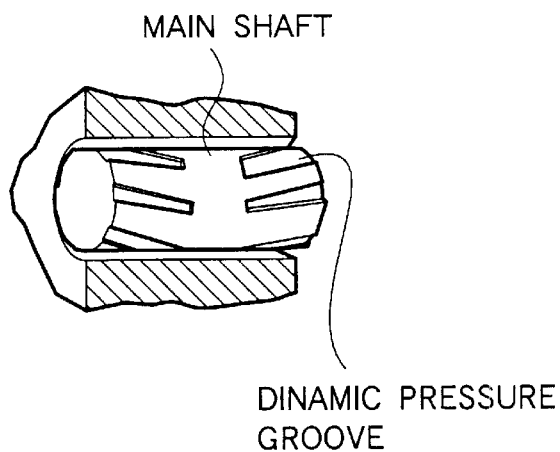
FIGS. 2 (2(a) and 2(b)) is explanatory views respectively showing dynamic pressure grooves defined in a radial dynamic pressure gap-forming surface and dynamic pressure grooves defined in a thrust dynamic pressure gap-forming surface.
Figure 2B:
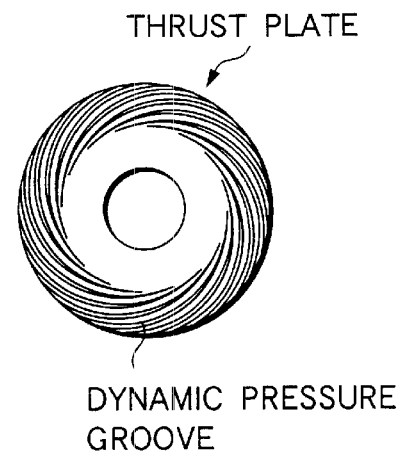

In at least one of the radial dynamic pressure gap-forming surfaces M1, M2 (for example, M1 of the main shaft 14), the known dynamic pressure grooves as shown in FIG. 2(a) may be formed for heightening the level of the generating dynamic pressure. Further, in at least one of the radial dynamic pressure gap-forming surfaces M3 to M6 (for example, M4, M6 of the thrust plates 21, 23), the known dynamic pressure grooves as shown in FIG. 2(b) may be formed.

In the following description, explanation will be made to a production method of the above mentioned ceramic dynamic pressure bearing 3.

The respective compound ceramic members, namely, the main shaft 14, the bearing portion 15 and the thrust plates 21, 23 are produced by a sintering process. That is, for the raw material of alumina grain of the average diameter being 1 to 5 µm, oxide grains such as MgO, CaO, CeO2, SiO2, Na2O as the sintering assistant components are mixed to be a forming base powder, to which (mixture) are added the conductive inorganic compound grains of average diameter being, e.g., 1 to 3 µm such as one or two kinds or more selected from titaniumnitride, titanium carbide, titanium boride, tungsten carbide, zirconium nitride, titanium carbon nitride, silicon carbide and niobium carbide in such as manner that the conductive inorganic compound phase occupies 15 to 70 vol % (desirably, 30 to 50 vol %) in a finally obtained compound ceramic. This forming basic powder is press-formed in corresponding shapes by a known forming process as a metal mold or a cold hydrostatic pressure. The formed substance is baked at 1400 to 1700° C. to be sintered body. This sintered body is subjected to a grinding process to have required faces including predetermined faces of the dynamic pressure gap-forming surface and finished into desired dimensions.

Figure 5A:
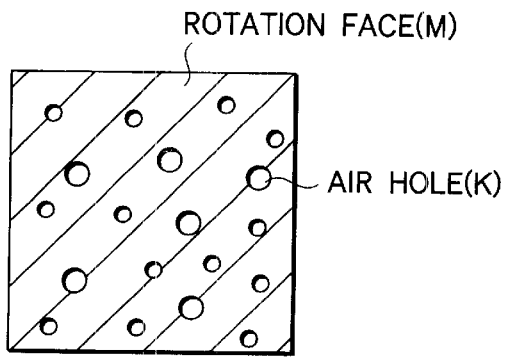
FIGS. 5 (5(a), 5(b), 5(c) and 5(d)) is a schematic view showing the dynamic pressure gap-forming surface formed with air holes in the surface, and explanatory views showing that air holes are formed by grains falling when grinding.
Figure 5B:
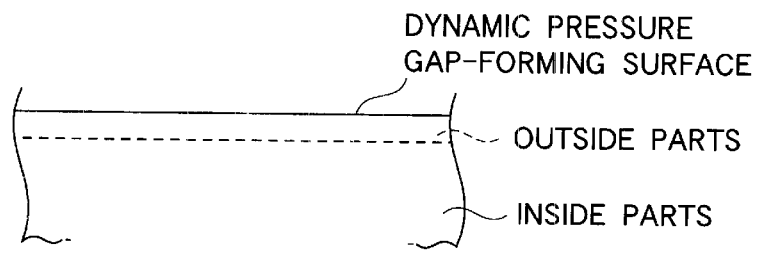
Figure 5C:
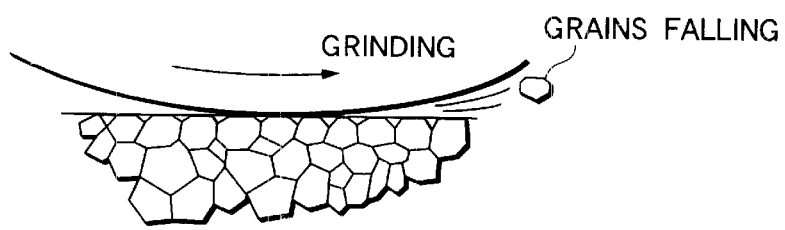
Figure 5D:
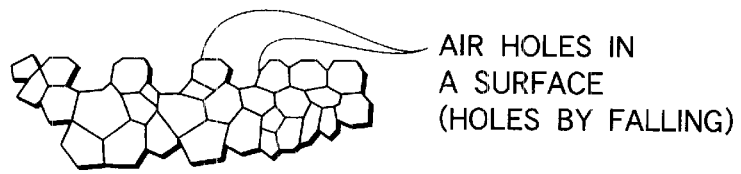

As seeing in FIG. 5(c), in the dynamic pressure gap-forming surface to be finished by a grinding polish or a lapping polish by grinding stone, the surface air-hole is formed by grains dropping at grinding. The average values of dimension of the surface air-holes to be formed, the dispersion thereof and the area rate of the same are adjusted to be within the above mentioned preferred ranges by adjustment of the grinding conditions such as the average values of dimension of the ceramic crystal grain composing the sintered body, the average values and the dispersion thereof, or the sizes (gage) of grinding stones or abrasive grains, and grinding time. As the easiness of dropping the ceramic crystal grains when grinding is sometimes influenced by compositions or dispersions of grain phases resulting from the sintering assistant component, it is necessary to appropriately adjust the grinding conditions, taking said influences into consideration in order to effect the forming conditions of preferable surface air holes.

The ceramic member finished with the dynamic pressure gap-forming surface as mentioned above has the structure forming air holes in the surface of the fine sintered body having dropped ceramic grains, that is, as shown in FIG. 5(b), the characteristic structure of finer inside parts than outside parts with the surface air-holes existing. Accordingly, owing to the existence of the surface air-holes, it is possible to effectively attempt prevention of abrasion by adhesion, linking or increase of the level of generating dynamic pressure, and at the same time, owing to the formation of fine inside parts, the strength of the ceramic member goes up. The surface layer basically maintains the fine structure in parts from which grains do not fall, and so the abrasion resistance is largely improved therein than a case of composing the structure as sintered porous ceramic not fine inherently.

When terminating the finishing process on the dynamic pressure gap-forming surface M, the dynamic pressure grooves are defined by the sand blasting or etching, and the main shaft 14, the bearing portion 15 or the thrust plates 21, 23 are finally produced. As illustrated in FIG. 3, the supporter 7 (herein, formed in disc shape having a hole 7a for inserting the bearing portion 15), the permanent magnet 9 and the coil 13 are associated by adhesion, and further, the main shaft 14, the bearing portion 15 and the thrust plates 21, 23 are set up by use of the bolt 25. Thus, the motor with the dynamic pressure bearing is produced. If attaching the polygon mirror 8 to the supporter 7, the polygon scanner 1 is assembled.

The polygon scanner 1 is actuated as follows. The motor 2 with the dynamic pressure bearing is composed as an AC inductive motor, and the polygon mirror 8 is integrally rotated around the main shaft 14 as a fixed shaft together with the bearing portion 15 and the supporter 7 by conduction to the coil 13. The maximum rotation number is of high speed rotation of 8000 rpm or more, and when demanding more larger scanning speed, the maximum rotation number may reach 10000 rpm or more or 30000 rpm or more (for example, around 50000 rpm). Accordingly, a turning number of the coil 13, a value of external magnetic field generated by the exciting permanent magnet 9, and a rated driving voltage are appropriately determined for realizing the above mentioned maximum rotation number, taking rotation load of the polygon mirror 8 into consideration. Herein, there occur the radial dynamic pressure concerned with the axis O of rotation in the radial dynamic pressure gap 17 between the main shaft 14 and the bearing portion 15, and the thrust dynamic pressure in the thrust dynamic pressure gap 18 between the thrust plates 21, 23 and the bearing portion 15. In both of the radial direction and the thrust direction, the axis of rotation of the polygon mirror 8 is supported under a condition of maintaining non-contacting state between the relatively rotating members.

Figure 7:
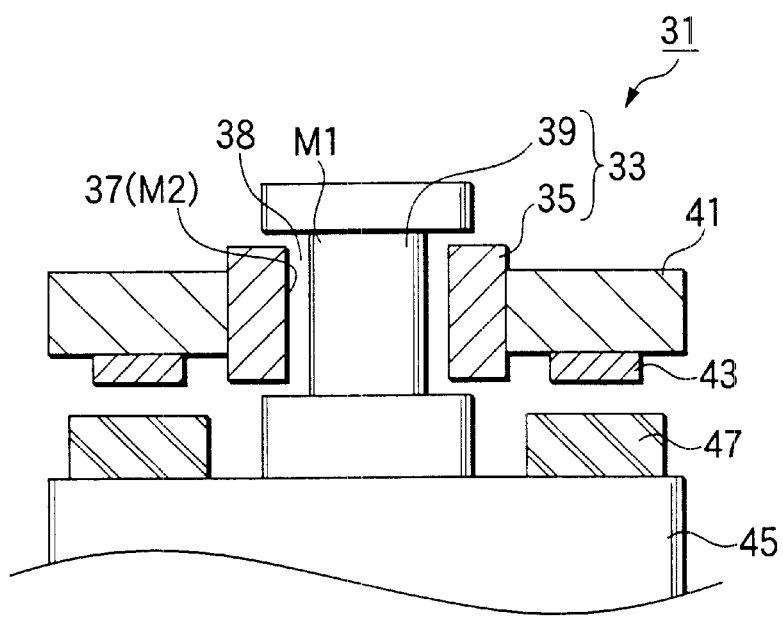
FIG. 7 is a schematically cross sectional view showing a modification of the motor unit employing the inventive ceramic dynamic pressure bearing.

FIG. 7 shows another example of a motor to be used to the polygon scanner (omitting an illustration). This motor 31 is also composed by including the ceramic dynamic pressure bearing 33 of the invention. The ceramic dynamic pressure bearing 33 has the cylindrical bearing portion 35 (for example, the inner diameter: 13 mm or longer, the outer diameter: 25 mm, the axial length: 5 mm) and the main shaft 39 (the diameter: 13 mm or shorter, the length: 8 mm) inserted in the axial direction of the bearing portion 35 in the insertion hole 37, and the main shaft 39 is fixed and not rotary but the bearing portion 35 rotates therearound. The inner periphery of the bearing portion 35 and the outer periphery of the main shaft 39 are respectively the radial dynamic pressure gap-forming surfaces M2, M1, and a radial dynamic pressure gap 38 is defined therebetween. Of the ceramic dynamic pressure bearing 33 in FIG. 7, the bearing portion 35 and the main shaft 39 are larger in the dimensions in the axial direction than the ceramic dynamic pressure bearing 3 in FIG. 3, and as the radial dynamic pressure is main as the supporting force of the axis O of rotation, the thrust plate is omitted.

Similarly to the ceramic dynamic pressure bearing 3 in FIG. 3, for rotating the bearing portion 35, the permanent magnet 43 is arranged on the ring-like supporter 41 unified on the outer periphery of the bearing portion 35, while the coil 47 opposite to the permanent magnet 43 is furnished on the base 45. In addition, on at least one dynamic pressure gap-forming surface M of the bearing portion 35 and the main shaft 39, for example, the outside dynamic pressure gap-forming surface M1 (the outside dynamic pressure gap-forming surface) of the main shaft 39, the dynamic pressure grooves as shown in FIG. 2(a) are defined.

Figure 8:
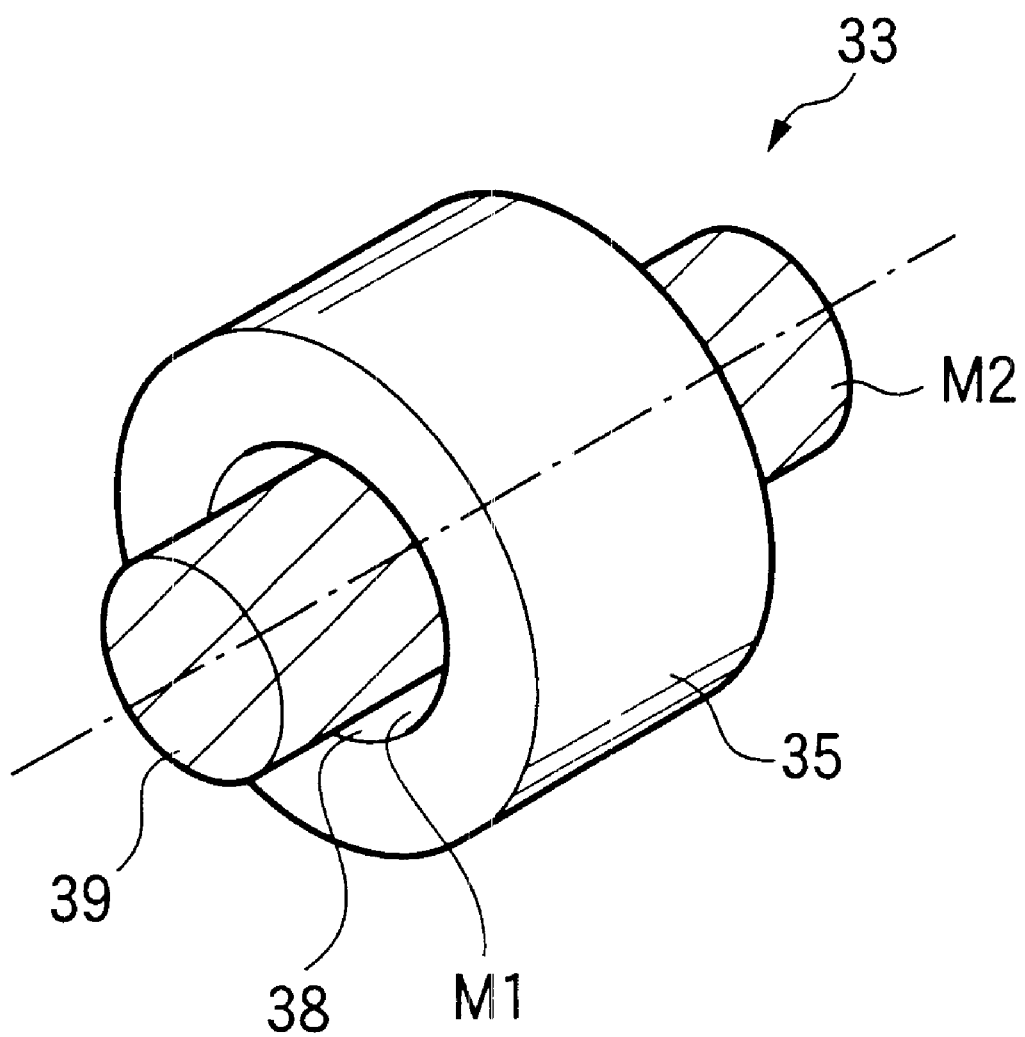
FIG. 8 is a perspective view showing an elementary part of another modified example.

At least either of the main shaft 39 and the bearing portion 35 may be composed with other materials, for example, a metal. FIG. 8 shows an example where the main shaft 39 is composed with a stainless steel, and the bearing portion 35 is composed with ceramic, and vice versa.

Figure 9:
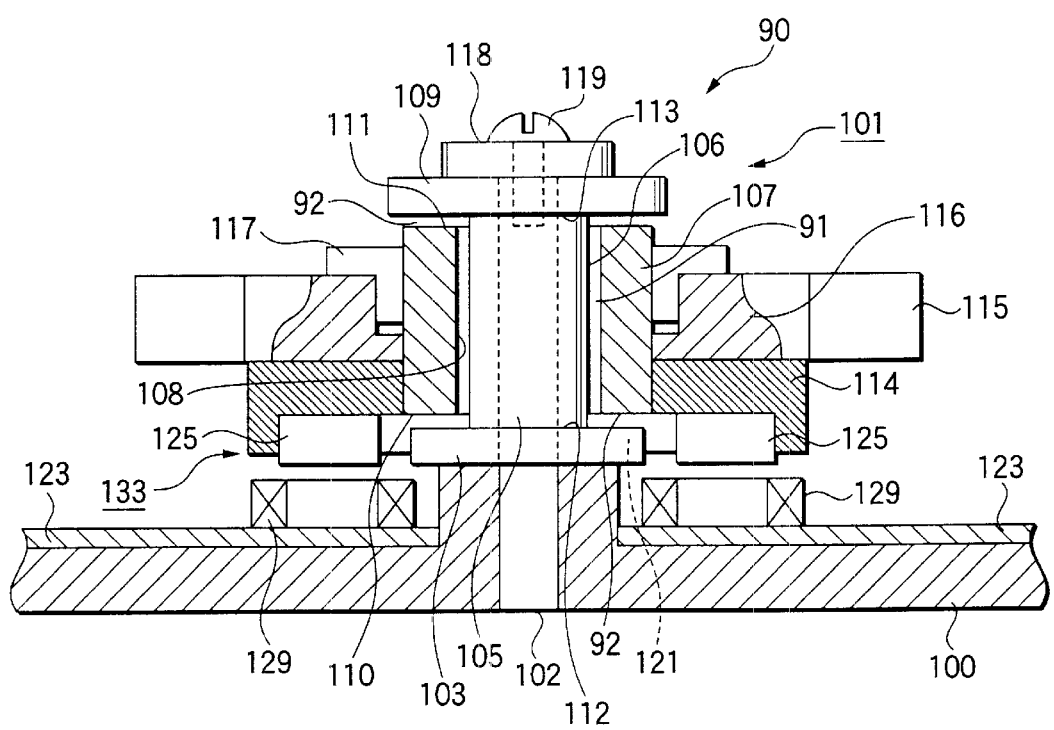
FIG. 9 is a front and cross sectional view showing one example of the polygon scanner employing the inventive ceramic dynamic pressure bearing.

FIG. 9 shows a more specifically composed example of the polygon scanner. A core axis 102 is vertically secured at one end on a base 100 in the polygon scanner 90 for fixedly supporting the ceramic dynamic pressure bearing 101 of the invention. The core axis 102 is secured with a ceramic made lower thrust plate 103, and is penetrated with a ceramic made main shaft 105. Further, a ceramic made bearing portion 107 has a radial dynamic pressure gap 91 (1 to 7 µm)

between the radial dynamic pressure gap-forming surface 106 forming a cylindrical outer periphery of the main shaft 105 and the radial dynamic pressure gap-forming surface 108 forming an inner periphery of the bearing portion 107. A ceramic made upper thrust plate 109 is fixedly inserted in the core shaft 102. The thrust dynamic pressure gaps 92, 92 are formed respectively between the thrust dynamic pressure gap-forming surfaces 110, 111 formed on the upper part and the lower part of the bearing portion 107, the thrust dynamic pressure gap-forming surface 112 of the lower thrust plate 103 and the thrust dynamic pressure gap-forming surface 113 of the upper thrust plate 109. The material qualities of the respective members are also herein the compound ceramic of the alumina based ceramic and the conductive ceramic, and have the same structure as the ceramic dynamic pressure bearings 3 or 33 in FIG. 3 or 7 structurally or in composition.

The bearing portion 107 is secured on the outer periphery with a supporter 114 formed with another body, and the polygon mirror 116 formed with many reflecting faces 115 is fixed to the supporter 114 via a fixing member 117 (the rotating body and the supporter 114 may be one body). The core axis 102 is fixed at the other end by a holding seat 118 and a bolt 119. The thrust dynamic pressure gap-forming surface 112 of the lower thrust plate 103 is defined with the same dynamic pressure grooves 121 as shown in FIG. 2(*b*). Although not shown, the main shaft 105 (called also as "outer periphery 106") forming the radial dynamic pressure gap-forming surface 106 is also defined on the outer periphery thereof with the same dynamic pressure grooves as shown in FIG. 2(*a*).

On the base 100, as a structure of a three-phase brushless motor 133, a coil 129 is provided via an insulating member 123, and a magnet 125 is provided in opposition to the coil 129 with respect to the rotating direction under the supporting member 114 of the bearing portion 107. By conduction to the coil 129, the three-phase brushless motor 113 functions as the driving motor of the polygon mirror 116 for making inductive rotation of the bearing portion 107 at high rotation. By rotation of the three-phase brushless motor 133, the dynamic pressure is produced in the radial dynamic pressure gap 91, so that smooth rotation at high speed is possible.

When the bearing portion 107 is at rest, the thrust dynamic pressure gap-forming surface 112 of the lower thrust plate 103 and the opposite face 110 of the bearing portion 107 contact. When the bearing portion 107 starts to rotate around the main shaft 105, the thrust dynamic pressure occurs at the thrust dynamic pressure gap 92 to release the contacting condition, and the high speed rotation is possible.

Figure 10:
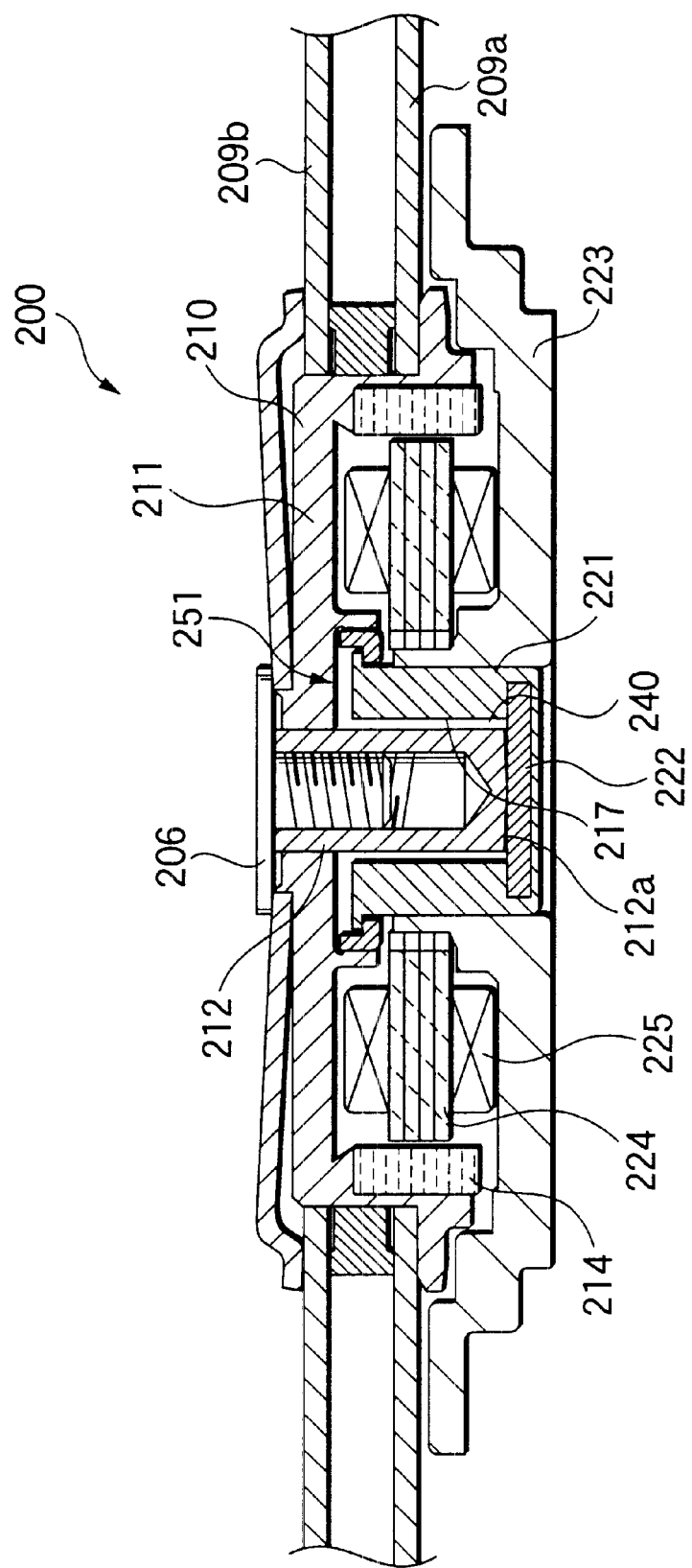
FIG. 10 is a front and cross sectional view showing one example of a hard disc apparatus employing the inventive ceramic dynamic pressure bearing.

FIG. 10 shows an example of applying the invention to a hard disc apparatus. The hard disc apparatus 200 is secured with magnetic discs 209*a*, 209*b* at the outer periphery of a hub 211 and with a motor rotating shaft 212 at the center. The hub 211 rotates together with the discs 209*a*, 209*b* fixed thereto. The motor rotating shaft 212 is pivoted in the radial direction by a securing bearing portion 221 comprising the compound ceramic and is pivoted in the thrust direction by a thrust plate 222 comprising the compound ceramic.

Since the motor rotating shaft 212, the securing bearing portion 221 and the thrust plate 222 comprise the ceramic material, the motor rotating shaft 212 and the securing bearing portion 221 have mechanical rigidity durable against load and high speed rotation of the discs 209*a*, 209*b* rotating at high speed.

Between the motor rotating shaft 212 and the securing bearing portion 221 and between the motor rotating shaft 212 and the thrust plate 222, the air is filled, while between the motor rotating shaft 212 and the securing bearing portion 221, the radial dynamic pressure gap 240 is defined in the peripheral direction, and the securing bearing portion 221 is defined on the inner peripheral face 217 with the dynamic pressure grooves (not shown) Accompanying rotation of the motor rotating shaft 212, the radial dynamic pressure is generated in the radial dynamic pressure gap 240, and the motor rotating shaft 212 rotates under non-contacting the securing bearing portion 221. The outer periphery of the motor rotating shaft 212 forming the radial dynamic pressure gap-forming surface and the inner periphery of the securing bearing portion 221 are composed similarly to the ceramic dynamic pressure bearings 3 and 33 of FIGS. 3 and 7 (namely, having the structure of the ceramic dynamic pressure bearing of the invention). An end 212*a* of the motor rotating shaft 212 is shaped in spherical pivot and supports force exerting in the thrust direction with a thrust plate 222.

In the hard disc apparatus 200, a stator core 224 is fixed to a bracket 223 and is coiled with stator coil 225. Similarly to the polygon scanner 90 in FIG. 9, the rotation driving force of the motor is produced by rotation magnetic field made by the stator core 224 excited by applying current to the stator coil 225 and a driving magnet 214 multi pole magnetization encircling around the stator core 224. The magnet 214 is secured to the inner periphery of the hub 211 and composes a rotor 210 together with the hub 211. Incidentally, in the hard disc apparatus 200, the bearing portion 221 of the outside is fixed, and the main shaft 212 (rotating shaft) is rotary, but explaining by use of FIG. 3, if the polygon mirror 8 is replaced with the magnetic disc 408, such a hard disc apparatus maybe naturally composed where the bearing portion 15 is made rotary and the main shaft 14 is made fixed.

Of course, the invention is not limited to the above mentioned examples, and so far as not deviating from the subject matter of the invention, various modifications are available. For instance, as the fluid generating the dynamic pressure, gases other than the air maybe employed, or instead of the gas, fluid as an oil or a water may be used.

EXAMPLE

For confirming the effects of the invention, the following experiments were carried out.

The respective members of the bearing portion 15, the main shaft 14 and the thrust plates 21, 23 shown in FIG. 3 were produced of the sintered compound ceramic as follows. Namely, as powders for forming the ceramic matrix (called as "matrix powder" hereafter), the under mentioned substances were prepared.

① Mixture of 100 wt parts of silicon nitride powder, 3 wt parts of magnesium carbonate (extra pure reagent), 2 wt parts of zirconium oxide (the average diameter: 2 μm), 2 wt parts of cerium oxide (average diameter: 1.5 μm), and 1 wt part of alumina (the average diameter: 0.2 μm), ② mixture of 100 wt parts of alumina powder (alumina purity: 99.7 wt %, average diameter 0.4 μm) and 0.1 wt parts of MgO powder as the sintering assistant component (extra pure reagent), and ③ (a zirconia powder (mixed with yttoria of 3.6 wt % as the stabilizing agent, the average diameter: 1.1 μm).

Titanium nitride (TiN: average diameter 1.1 μm) was prepared as the conductive compound powder.

To the respective above ① to ③ matrix powders, the titanium nitride powder was mixed in a manner that the titanium nitride phase as the conductive inorganic compound phase finally occupying in the ceramic matrix would be 8 to 70 vol %, and to 100 wt parts of this mixture, 50 wt parts of the pure water as the solvent and an organic binding agent of a proper amount were added, and the mixing was carried out with a ball mill for 10 hours, and the slurry of the forming basic powder was obtained. The slurry was made the basic powder of pellet raw material by spraying and drying by a spray-dry process.

The basic powder of pellet raw material was formed into shapes for the respective members through the metal mold value of the conduction of the motor, and at the same time, superior (⊚) was no abnormal torque occurring until finishing the cycle, which (torque) was seemed as based on the linking at starting, better (○) was the torque increase of less than 10% assumed as resulted from the linking on the basis of the torque level of starting in average of the rotation evaluated as "superior", good (Δ) was the torque increase seen in the range of 10% to less than 50%, but not impossible to rotate, and bad (X) was the rotation frequently impossible to start by the torque increase of more than 50%. The results are shown in Table 1.

TABLE 1

| Quality of base material | Mixing ratio of TiN (vol %) | 8 | 15 | 17 | 20 | 25 | 30 | 50 | 70 |
|---|---|---|---|---|---|---|---|---|---|
| Silicon nitride | Specific electric resistance (Ω · cm) | >10$^{12}$ | 7 × 10$^4$ | 1 × 10$^4$ | 2 × 10$^3$ | 80 | 20 | 10 | 3 |
|  | Adhesion wearing | X | ○ | ○ | ⊚ | ⊚ | ⊚ | ⊚ | ○ |
|  | Linking | X | ○ | ○ | ○ | ○ | ⊚ | ⊚ | ⊚ |
| Alumina | Specific electric resistance (Ω · cm) | >10$^{12}$ | 1 × 10$^5$ | 5 × 10$^3$ | 7 × 10$^2$ | 1 × 10$^2$ | 50 | 7 | 5 |
|  | Adhesion wearing | X | Δ | ○ | ○ | ○ | ⊚ | ⊚ | ○ |
|  | Linking | X | ○ | ○ | ⊚ | ⊚ | ⊚ | ⊚ | ⊚ |
| Zirconia | Specific electric resistance (Ω · cm) | 10$^7$ | 3 × 10$^4$ | 5 × 10$^2$ | 2 | 1 × 10$^{-2}$ | 7 × 10$^{-3}$ | 1 × 10$^{-4}$ | 1 × 10$^{-4}$ |
|  | Adhesion wearing | X | ○ | ⊚ | ⊚ | ⊚ | ⊚ | ⊚ | ○ |
|  | Linking | X | ○ | ○ | ○ | ○ | ⊚ | ⊚ | ⊚ | pressing process, and subsequently, the obtained spherical products were baked under the following conditions.

The forming basic powders ① and ②: baked at 1700° C. for 3 hours in the N2 atmosphere of 100 atm.

The forming basic powder ③: baked at 1650° C. for 5 hours in the atmosphere at normal pressure.

The forming basic powder ④: baked at 1500° C. for 2 hours in the Ar atmosphere of 1000 atm.

The obtained sintered substance was subjected to the grinding with the diamond grinding stones of gage #100 to #200 at the inner periphery and both ends of the bearing portion 15 becoming the dynamic pressure gap-forming surface, the outer periphery of the main shaft 14, and the opposite faces to the bearing portion 15 of the thrust plates 21, 23, subjected to the lapping grinding for surfacing with the diamond grinding stone of gage #6000, and subjected to the masking for shot blasting treatment at ranges other than the ranges planned to be groove patterns, whereby the dynamic grooves shown in FIG. 2 were defined. The electric resistivity in the surfaces defined with the dynamic grooves was measured by the DC four probe method in the surface.

The above mentioned respective members were incorporated in the motor with the dynamic pressure bearing shown in FIG. 3 for performing the under mentioned tests. The cycles of accelerating the motor until the rotation number 30000 rpm from the rest condition, holding for 1 minute and stopping, was repeated until 100000 times. With respect to abrasion by adhesion in the dynamic pressure gap-forming surface, the evaluations were made in that no abrasion by adhesion was seen until finishing the cycle was superior (⊚), slight abrasion by adhesion was seen until finishing the cycle was better (○), somewhat large adhesion was seen until finishing the cycle was good (Δ), and large abrasion by adhesion occurred on the way of the cycle and the test was impossible to continue was bad (X). Further, with respect to the linking, the rotation torque was assumed from the current If the mixing amount of titanium nitride is 10 vol 5 or more, it is seen that the specific electric resistant value can be 10$^6$ Ω·cm or lower. If using the ceramic of the specific electric resistant value lower than said value, the abrasion by adhesion and the linking are difficult to occur.

This application is based on Japanese Patent application JP 2001-035913, filed Feb. 13, 2001, the entire content of which is hereby incorporated by reference, the same as if set forth at length.

What is claimed is:

1. A ceramic dynamic pressure bearing comprising a first member and a second member, wherein the first member and the second member define a dynamic pressure gap therebetween, the first member and the second member relatively rotate around an axis of rotation, the relative rotation generates a fluid dynamic pressure in the dynamic pressure gap, the first member has a first surface directing to the dynamic pressure gap and the second member has a second surface directing to the dynamic pressure gap, and at least one of the first and second surfaces comprises ceramic, the ceramic comprises: a ceramic matrix that is selected from alumina ceramic, zirconia ceramic and silicon nitride ceramic; and 15 vol % to 70 vol % of an electrically-conductive inorganic compound phase based on the total amount of the ceramic, the phase is dispersed in the ceramic matrix, the phase comprises at least one compound selected from tungsten carbide, silicon carbide, conductive oxide, metallic nitride, metallic carbide, metallic boride, and metallic carbon nitride, and the metallic nitride, the metallic carbide, the metallic boride, and the metallic carbon nitride each independently comprises at least one of Hf, Mo, Ti, Zr, Nb, and Ta.

2. The ceramic dynamic pressure bearing according to claim 1, wherein the ceramic has an electric resistivity of $10^6$ Ω·cm or lower.

3. The ceramic dynamic pressure bearing according to claim 1, wherein the electrically-conductive inorganic compound phase comprises at least one compound selected from titanium nitride, titanium carbide, titanium boride, tungsten carbide, zirconium nitride, titanium carbon nitride, silicon carbide and niobium carbide.

4. The ceramic dynamic pressure bearing according to claim 1, wherein the electrically-conductive inorganic compound phase comprises titanium oxide.

5. The ceramic dynamic pressure bearing according to claim 1, wherein the first member is formed in axis shape, the second member defines an insertion hole, the first member is inserted in the insertion hole, the first member has a first radial dynamic pressure gap-forming surface as a periphery of the first member and the second member has a second radial dynamic pressure gap-forming surface as a periphery of the insertion hole, and the first and second radial dynamic pressure gap-forming surfaces define a radial dynamic pressure gap therebetween.

6. The ceramic dynamic pressure bearing according to claim 1, wherein the second member has two ends in the direction of the axis of rotation, the first member is disposed in a state of being opposed to at least one of the two ends, the first member has at least one first thrust dynamic pressure gap-forming surface as the surface opposed to at least one of the two ends and the second member has two second thrust dynamic pressure gap-forming surfaces as the ends, and the first and second thrust dynamic pressure gap-forming surfaces defines at least one thrust dynamic pressure gap therebetween.

7. The ceramic dynamic pressure bearing according to claim 1, wherein at least one of the first and second surfaces have a dynamic pressure groove.

8. The ceramic dynamic pressure bearing according to claim 1, which is served as a bearing for a rotary-spindle of a hard disc in a hard disc apparatus.

9. The ceramic dynamic pressure bearing according to claim 1, which is served as a bearing for a rotary-spindle of a polygon mirror in a polygon scanner.

10. A motor comprising the ceramic dynamic pressure bearing according to claim 1 as a bearing for a rotation outputting portion in the motor.

11. The motor according to claim 10, which is served for a rotation driving portion of a hard disc in a hard disc apparatus.

12. A hard disc apparatus comprising the motor according to claim 11 and a hard disk, wherein the hard disc is rotated and driven by the motor.

13. The motor according to claim 10, which is served for a driving portion of a polygon mirror in a polygon scanner.

14. A polygon scanner comprising the motor according to claim 13 and a polygon mirror, wherein the polygon mirror is rotated and driven by the motor.

15. The motor according to claim 10, which has a maximum rotating number of 8000 rpm or more.

* * * * *